United States Patent

[11] 3,617,014

| [72] | Inventor | Carl H. Warren |
| | | New Hope, Ala. |
| [21] | Appl. No. | 854,842 |
| [22] | Filed | Sept. 3, 1969 |
| [45] | Patented | Nov. 2, 1971 |
| [73] | Assignee | The United States of America as represented by the Secretary of the Army |

[54] FLUIDIC VANE ACTUATION DEVICE
4 Claims, 1 Drawing Fig.

[52] U.S. Cl. .................................................... 244/3.1, 137/81.5
[51] Int. Cl. .................................................... F41g 7/12, F42b 13/30, F42b 15/02
[50] Field of Search .......................................... 244/3.1, 3.2; 137/81.5; 102/81

[56] References Cited

UNITED STATES PATENTS

| 3,304,029 | 2/1967 | Ludke .......................... | 244/3.2 |
| 3,432,144 | 3/1969 | Warren ........................ | 137/81.5 X |
| 3,468,220 | 9/1969 | Lazar .......................... | 137/81.5 X |
| 3,485,253 | 12/1969 | Boothe ........................ | 137/81.5 |

*Primary Examiner*—Samuel Feinberg
*Assistant Examiner*—J. J. Devitt
*Attorneys*—Harry M. Saragovitz, Edward J. Kelly, Herbert Berl and Charles R. Carter

ABSTRACT: A fluidic control device for positioning missile directional vanes wherein an error signal from the missile gyro controls the output of a two-stage fluid amplifier. The output of the amplifier is used to drive a high-response power source which in turn rotates the directional vanes. A fluid feedback control is utilized in conjunction with the vanes for controlling the amplifier in response to the position of the vanes.

PATENTED NOV 2 1971 3,617,014
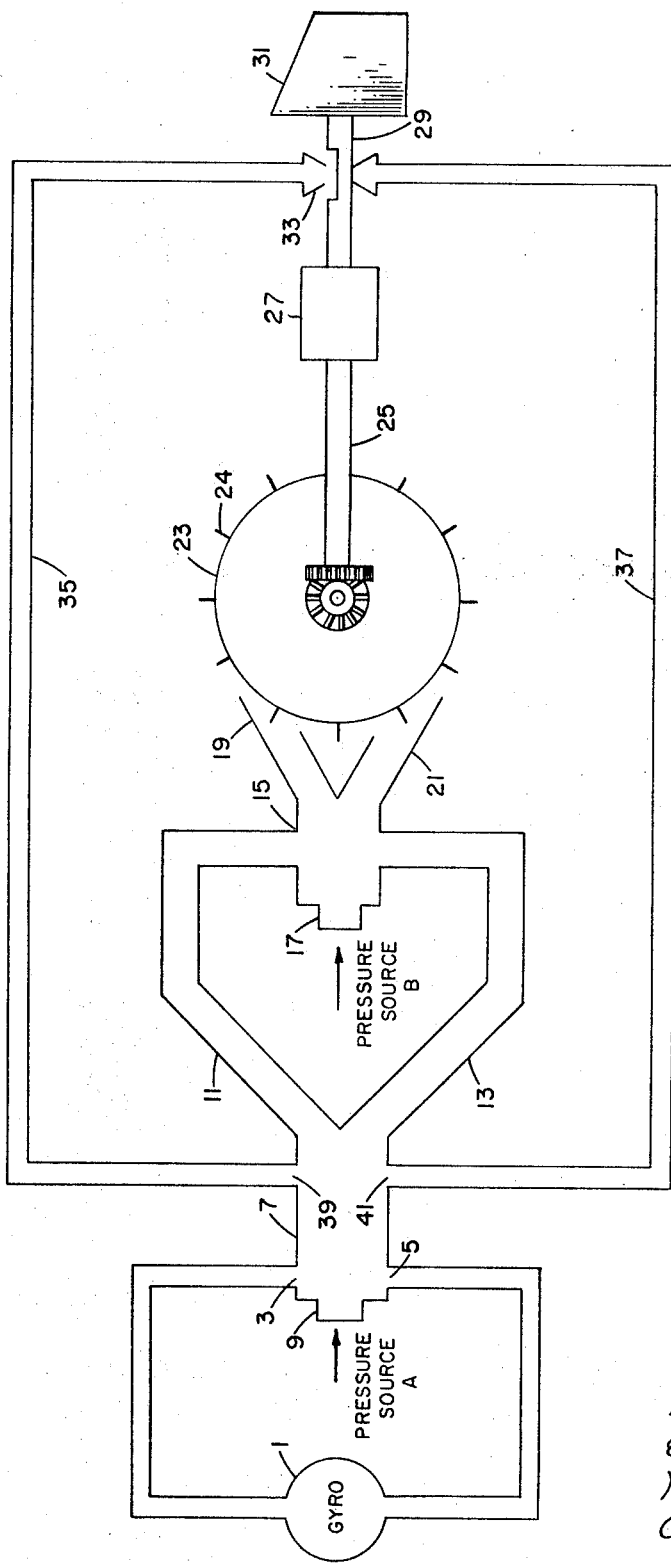
Carl H. Warren,
INVENTOR
Harry M. Saragovitz
Edward J. Kelly
Herbert Berl
Charles R. Carter

FLUIDIC VANE ACTUATION DEVICE

BACKGROUND OF THE INVENTION

Conventional vane actuation equipment include combinations of electromechanical devices for rotating the vanes. The more moving parts used to rotate the vanes the greater the risk of a mechanical breakdown.

SUMMARY OF THE INVENTION

This invention utilizes fluid means in place of many moving parts to drive a power source for rotating the vanes.

This invention may be better understood from the following detailed description taken in conjunction with the accompanying drawing.

BRIEF DESCRIPTION OF THE DRAWING

The single FIGURE is a schematic of the device.

DESCRIPTION OF THE INVENTION

A gyro 1, which is of the pneumatic pickoff type produced by Kearfott Systems and is known as the PDM tapp Mod II, generates the error signal for operation of the fluidic vane actuation device. This error signal is impressed across one set of input ports 3 and 5 of a fluid subsonic summing amplifier 7. The upstream side of amplifier 7 is provided with a channel 9 for connection to a fluid pressure source A which supplies fluid under a pressure of 5-30 p.s.i. On the downstream side of amplifier 7 are first and second diverging output channels 11 and 13 that act as input ports for a high-energy proportional fluid supersonic amplifier 15. The upstream side of amplifier 15 is provided with an input channel 17 for connection to a fluid pressure source B which supplies fluid under a pressure of 200-1,000 p.s.i. Amplifiers 7 and 15 constitute a two-stage fluid amplification. Supersonic amplifier 15 has first and second diverging output channels 19 and 21 for controlling the direction of rotation of a high-response power source 23 such as a turbine or gear motor. The power source has a number of fins 24 on the outer periphery thereof and the fluid exiting channels 19 or 21 impinges the fins to cause rotation of the power source. The power source is of very low inertia with fast acceleration and is connected by a shaft 25 to gear reducer 27. A shaft 29 connects gear reducer 27 to a directional air vane 31 located on the missile. A fluidic position pickoff 33 provides position information of shaft 29 which is fed back through control lines 35 and 37 to a second set of control ports 39 and 41 on amplifier 7. This provides a feedback control of the vane position with respect to the error signal input generated by gyro 1.

The operation of the device is as follows: An error signal enters amplifier 7 through port 3 and its pressure combines with the pressure of the fluid stream passing therethrough as well as shifts the fluid stream so that it will exit the amplifier through channel 13. The fluid stream from channel 13 enters amplifier 15 and combines with the pressure passing therethrough and shifts the fluid stream in amplifier 15 so that the combined stream will exit through channel 19. The output stream of amplifier 15 is in the supersonic range and will rapidly spin up power source 23 and through gear reducer 27 rotate vane 31 to the position responsive to the error signal. The feedback control will send a shaft position signal back to amplifier 7 through control port 41 that will balance the error signal.

An error signal entering port 5 will cause rotation of the vane in a direction opposite to that described above.

I claim:

1. A device for automatic fluidic control of a missile having a stabilization gyro and directional vanes comprising: a power source disposed to operate the vanes, a fluidic amplifier disposed to actuate the power source responsive to the position of the gyro and a fluidic feedback disposed to control the amplifier responsive to the position of the vanes, said feedback including a pickoff to provide vane position information, control lines for directing pickoff information and control ports on said amplifier for receiving said information.

2. A device as set forth in claim 1 wherein said power source is a turbine of low inertia and fast acceleration.

3. A device as set forth in claim 2 wherein said fluidic amplifier includes stages of successive amplification.

4. A device as set forth in claim 1 wherein said power source is a gear motor of low inertia and fast acceleration.